United States Patent Office 3,500,910
Patented Mar. 17, 1970

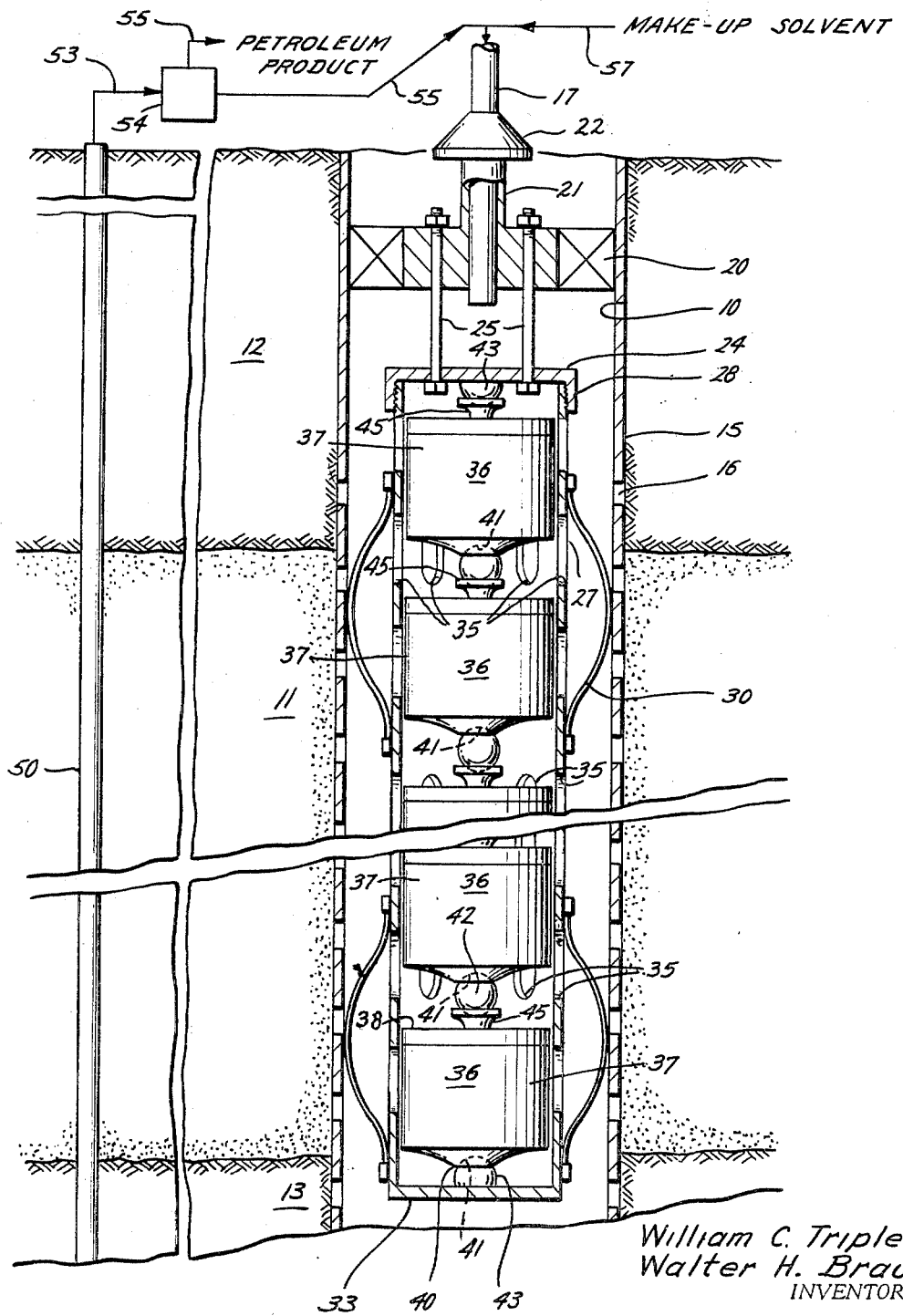

3,500,910
SOLVENT RECOVERY OF PETROLEUM
William C. Triplett and Walter H. Brauer, Ingleside, Tex., assignors to San Miguel Project, Inc., Ingleside, Tex., a corporation of Texas
Filed Jan. 26, 1967, Ser. No. 611,895
Int. Cl. E21b 43/24
U.S. Cl. 166—247                    7 Claims

ABSTRACT OF THE DISCLOSURE

Secondary recovery of petroleum products from subterranean formations. The process provides methods for dissolution of the petroleum products followed by displacement through the subterranean formation from one or more injeciton wells to one or more production wells. In addition, the process provides for down-hole heating of the liquid solvent in each injection well at the time the liquid solvent flows into the formation from the injection well. The liquid solvent is heated through use of heat generated by non-fissionable radioactive isotopes or radioactive waste material in general, as defined by the Atomic Energy Act of 1954 (as amended), Chapter 2, Section 11.

---

A principal object of the invention is to provide processes for introduction of heated liquid solvents into formations surrounding wells, wherein heating of the solvent is accomplished down-the-hole just prior to the introduction of the solvent into a subterranean, petroleum-containing formation, wherein the heated solvent is introduced into the petroleum-bearing earth formation to dissolve the petroleum from the formation, followed by displacement of the solvent-solute for recovery through one or more production wells, and including recovery of the petroleum from the solvent and recirculation of the solvent for re-use in subsequent cycles of operation.

An additional object of the invention is to provide such processes which are of novel form and which are efficient, convenient, economical, and safe.

According to the invention, a liquid solvent is flowed from the surface to a subterranean formation through a well, herein referred to as an injection well. A downhole heater is disposed in the injection well, usually immediately adjacent the subterranean formation, in a position wherein it will cause heating of the liquid solvent as the solvent flows down the injection well to flow into the subterranean formation to perform its solventing and displacement functions. The down-hole heater includes at least one canister, or other suitable container, of non-fissionable radioactive material which gives off heat to the solvent to heat the solvent before it flows from the well into the formation.

According to other processes, fluids have been used similarly without heating, or have been heated at the surface and then pumped into injection wells. But since production strata lie far beneath the earth's surface, up to 25,000 feet depths, it is strongly to be suspected that the fluid, whether heated at the surface or not, would be substantially at the ambient temperature in the well by the time it reached the subterranean formation, this because of heat transfer between the fluid and the well and surrounding earth materials. So, heating of fluids at the surface has been notably free of success, especially when the well is deeper than the shallowest range of wells.

As is well known, solvents are more effective in their solventing power when heated. Even where a liquid solvent and a liquid solute are mutually soluble completely, the rate of solution increases with increase in temperature. So, that, in accordance with this increased solubility effect, this invention provides for very high recoveries from oil-bearing strata at relatively low cost and with simplicity of operation. Not only is substantially all of the solvent recovered for re-use, but the high solution power of the heated solvent extracts a very high proportion of the petroleum from the formation.

Processes such as this are mainly to be used when the petroleum is of high gravity and/or the formation is of low porosity, so that the petroleum has poor flow characteristics through the formation. Since the solvent dissolves the petroleum, and both the solvent and the solvent-petroleum solution have relatively low gravities and viscosities, flow through the formation is improved, and the processes will often render recovery possible where it has heretofore been difficult and inefficient and costly, or impossible.

Other objects and advantages of the invention will appear from the following detailed description of preferred embodiments of the processes according to the invention, reference being made to the accompanying drawing, the drawings being a vertical cross sectional view showing the lower portion of a petroleum well having a down-hole heater apparatus disposed therein, and illustrating a preferred process according to the invention.

Referring to the drawing, and describing first the down-hole heater shown therein, well hole or bore 10 extends from the surface of the earth down through a petroleum-bearing formation 11 disposed at a distance, usually at least several thousand feet, below the earth's surface. The earth formation 12 immediately above the petroleum-bearing formation is often referred to as the overburden. The petroleum formation 11 overlies other earth formations 13.

Well hole 10 is lined by casing 15 which has a plurality of perforations 16 therethrough at formation 11. Other well casings may be in place in the well according to customary usage.

A pipe string 17, which may be well tubing, drill pipe, or another form of well pipe, extends from the surface to a short distance above formation 11. The lower end of pipe string 17 extends sealingly and removably through packer 20. Packer 20 has an upwardly extending formation 21 surrounding pipe string 17 which has upper end 22 adopted to be engaged by an overshot tool when the pipe string is not in place, for introduction, removal, and actuation of the packer. Pipe string 17 forms a flow passage from the surface to below packer 20.

A cap element 24 is suspended below packer 20 by plural bolts 25, the bolts being received through suitable openings through the packer and cap as shown. An elongate cylindrical carrier tube 27 is outwardly threaded around its upper end and screwed into threads provided around the inner surface of downwardly extended skirt 28 of cap 24 to be supported adjacent perforation 16 and formation 11. A plurality of centralizer springs 30 carried at the outer surface of carrier tube 27 maintain the carrier tube centrally of casing 15, so that there is fluid flow space completely around the carrier tube within the casing.

Carrier tube 27 is closed at its lower end by integral bottom web 33, and the side walls of carrier tube 27 are perforate, the perforations being shown in the form of plural closely spaced horizontal rows of closely circularly spaced vertical slots 35. The carrier tube is thus adapted for large crossflow of the liquid solvent therethrough, the solvent in flowing into, across, and out of carrier tube 27 flowing over all of the surfaces of canisters 36, or cans, which are disposed in "stacked" arrangement within carrier tube 27 as shown. Heat is transferred from the canisters to the solvent which flows past and over the surfaces of the canisters, so that the solvent heated. In view of the open structure of carrier tube 7, the solvent flows readily over the canister, and heat transfer efficiency is high.

Each of the canisters 36 is formed of relatively lightweight metal, each including a lower can or cup body portion 37, and a cover or lid 38 having a downwardly extending surrounding skirt or flange which fits closely around the upper end of body portion 37. The lid is firmly secured and sealed so that no leaks can occur around the lid.

The bottom 40 of each cup body 37 is flared downardly to a downwardly facing concentric concave recess 1 adapted to receive an upper surface portion of a spherical ball 42, or a portion 43 of such a ball. Each lid 38 has a spacer 45 at its center, of squat mushroom shape, the upper surface of which has a concentric upwardly facing concave recess adapted to receive a lower surface portion of a ball 42 or part-ball 43.

A part-ball 43 is placed or fixed at the center of the upper surface of bottom web 33, the lowermost canister 36 placed thereon, and additional balls 42 and canisters 36 placed sequentially upward within carrier tube 27. The spacer 45 of the uppermost canister 36 contacts a part-ball 43 placed or fixed at the underside of cover 24 of the carrier tube. Thus, the carrier tube contains a plurality of canisters spaced apart and from the ends of the tube by the ball elements, and secured against undue movement in the tube. It is preferred if the canisters and balls are fitted closely end-to-end within the tube, so that the canisters are fixed at least fairly securely. The lateral spacings between the sides of the canisters and the inside of the carrier tube need not be any closer than necessary to keep the canisters from excessive lateral movements. With the canisters retained in spaced fashion as described, the solvent is enabled to contact substantially all of their surfaces to be heated.

The canisters are preferably formed of an alloy steel which will be resistant to corrosion such that the canisters will continue to be strong and leakproof such that the isotope material which they contain will not be released to become mixed with the solvent and subsequently returned to the surface with the solvent. The spacer balls 42 and part-balls 43 are preferably formed of inert material such as porcelain. All parts of the apparatus should be of materials suitable to their use and environment, and the materials herein mentioned for some elements are by way of example.

The canisters 36 each contain non-fissionable radioactive istotope material, which, because of its degeneration, constantly gives off heat (although the amount of heat given off decreases according to the half life span of the material). Such materials are available as radioactive wastes, at low cost in view of the fact that such wastes are sought to be disposed of, and this invention provides a useful manner of using (or disposing of) the wastes. The heat output of these materials may be relatively high, and the material of canisters 36 must be able to withstand this heat, as well as being a good heat conductor to dissipate the heat to the solvent.

Still referring to the drawing, a recovery or production well 50 at some distance from well 10 (and there may be more than one recovery well just as there may be more than one injection well, all of the wells arranged in a field pattern for efficient operation as is well known in the art), receives a solution of the liquid solvent together with the petroleum materials dissolved therein from formation 11. Well 50, which is shown schematically in the drawing, is used to deliver the solvent-petroleum solution to the surface in any conventional manner. From well 50, the solvent-petroleum solution is delivered as indicated by schematic flowline 53 to separator apparatus 54. Separator 54 causes separation of the recovered solvent and the recovered petroleum products which were dissolved from formation 11 by the solvent. The petroleum products are delivered from the separator 54 through flowline 55. The recovered solvent is delivered into the upper end of pipe string 17 for another cycle of use. Makeup solvent from a suitable source is added through flowline 57. Auxiliary equipment (not shown), such as valves, pumps, storage tanks, conditioning tanks for the solvent, pressure regulators, pressure controls, and the like, are included as may be necessary. Since such auxiliary equipment will be included according to customary practice, and may take any of a number of known forms, it is not believed necessary that it be described in detail.

Separator 54 may be any of the separators known in the art which are suitable for the separation of the solvent from the dissolved crude petroleum. These include separators of the distillation types, steam distillation types, the adsorptive and absorptive types, salt-effect types, and many others which are well known in the art. Whichever type of separator equipment is employed, the solvent and petroleum are separated, the solvent being recovered for re-use, and the petroleum being the product.

It will be evident from the foregoing descriptions that the invention will be particularly useful in the recovery of heavy petroleum crudes, including the crudes containing a high percentage of asphaltic tars, since these materials have poor flow characteristics and are difficult to move through the formation toward the production well.

As has been mentioned, the non-fissionable radioactive isotopes used within the heating elements will usually be radioactive waste materials. These include such materials as distrontium titanate, $Sr_2TiO_4$, the strontium being the strontium-90 isotope, cerium-144 materials; and cerium-137 materials, and others. The canisters must be made of material which is compatible with the isotope material; for example, the strontium-90 material is compatible with the alloy made and sold under the trademark Hastelloy C of Union Carbide Corporation—Stellite Division, the composition of which is well known and satisfactorily defined in the literature in the United States. Other materials are satisfactory for use with this and the other isotopes. The requirement is of lack of chemical reaction and lack of corrosion between the materials.

The solvent must be capable of dissolving the crude at the elevated temperatures. Kerosene, and materials somewhat more and less viscous may be used. The canisters will reach temperatures of about 1100° F., so that the solvent may become quite hot. The solvent, therefore, must be compatible with the degree of heating attained. The process may be carried on continuously, with solvent flowing continuously over the heating elements, or batch-wise, with solvent moved to contact with the heating elements and held there until sufficiently heated, then being outflowed to the formation. In addition, as an alternative manner of carrying on the process, the solvent may be "squeezed" into the formation under pressure, and then recovered through the same well.

Since the heating elements will be of long life, important economies will be realized. For example, strontium-90 has a half-life of about 30 years, and when 40 canisters 36 of the present size, are employed, the heat output may initially be as high as 1,000,000 B.t.u./hr. When the heating has decreased because of deterioration of the isotope material, all or part of the canisters may be replaced.

Strontium-90 is particularly suitable as the isotope material, since its deterioration materials do not include gases which would create excessive pressures within the canisters.

While preferred embodiments of the invention have been shown and described, many modifications of the invention may be made by a person skilled in the art without departing from the spirit of the invention, and it is intended to protect by Letters Patent all forms of the invention falling within the scope of the following claims:

We claim:

1. Method for recovering petroleum products from earth formations, comprising running a heater apparatus into a well to a location adjacent the earth formation from which the petroleum products are to be recovered, said heater apparatus including at least one container containing non-fissionable radioactive isotope material, flowing a solvent down the well past the heater apparatus to heat the solvent, flowing the heated solvent into the earth formation whereby the solvent dissolves petroleum products from the earth formation, and recovering the solution and dissolved petroleum products from the earth formation.

2. Method according to claim 1, the solution of solvent and dissolved petroleum products being recovered through at least one additional well spaced from the first-named well.

3. Method according to claim 2, including separating the recovered solution of solvent and dissolved petroleum and recycling the solvent to said first-named well.

4. Method according to claim 1, the solution of solvent and dissolved petroleum products being recovered through said well.

5. Method according to claim 4, including separating the recovered solution of solvent and recovered petroleum and recycling the solvent to the well.

6. Method according to claim 1, said solvent being kerosene.

7. Method for recovering petroleum products from earth formations, comprising running a heater apparatus into a well to a location adjacent the earth formation from which the petroleum products are to be recovered flowing a solvent down the well past the heater apparatus to heat the solvent, flowing the heated solvent into the earth formation whereby the solvent dissolves petroleum products from the earth formation, and recovering the solution and dissolved petroleum products from the earth formation; said heater apparatus comprising at least one container containing radioactive isotope material; said flowing of solvent past said heater apparatus to heat the solvent being non-continuous, the solvent flow being interrupted whereby a portion of solvent will remain adjacent the heater apparatus for a longer period of time before flowing into the formation.

References Cited

UNITED STATES PATENTS

| | | | |
|---|---|---|---|
| 2,670,802 | 3/1954 | Ackley | 166—11 |
| 2,862,558 | 12/1958 | Dixon | 166—40 |
| 2,911,047 | 11/1959 | Henderson | 166—61 |
| 3,080,918 | 3/1963 | Natland | 166—39 X |
| 3,126,055 | 3/1964 | Hanson | 166—39 |
| 3,167,121 | 1/1965 | Sharp | 166—11 |
| 3,246,695 | 4/1966 | Robinson | 166—40 X |
| 3,266,569 | 8/1966 | Sterrett | 166—2 |
| 3,349,850 | 10/1967 | Schlicht et al. | 166—40 |

STEPHEN J. NOVOSAD, Primary Examiner

U.S. Cl. X.R.

166—58, 272